United States Patent Office.

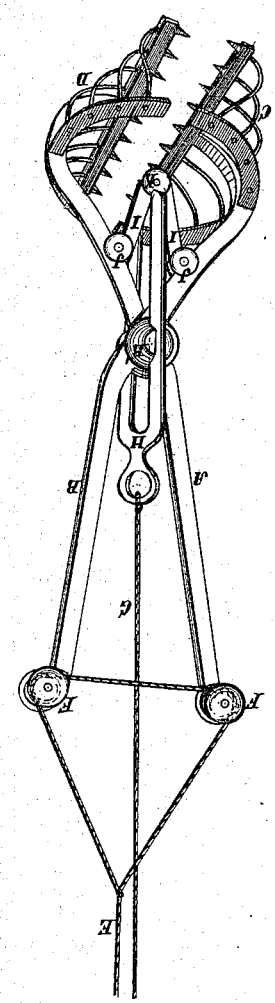

EDWARD WARD, OF SMYRNA, DELAWARE

Letters Patent No. 107,740, dated September 27, 1870.

IMPROVEMENT IN OYSTER-TONGS.

The Schedule referred to in these Letters Patent and making part of the same.

*To all whom it may concern:*

Be it known that I, EDWARD WARD, of Smyrna, in the county of Kent and State of Delaware, have invented a new and useful Improvement in Oyster-Tongs; and I do hereby declare that the following is a full, clear, and exact description thereof, which will enable others skilled in the art to make and use the same, reference being had to the accompanying drawing forming part of this specification.

This invention relates to a new and useful improvement in tongs for taking oysters from the water; and consists in such a construction and arrangement of parts that the tongs are opened and closed by means of cords, as will be hereinafter described.

The accompanying drawing is a perspective view of the tongs.

A and B are the levers or bars to which the jaws are attached.

B is the joint or fulcrum by which the levers are connected.

C and D are the jaws which are made open and grated, but so as to close in the basket form. I do not confine myself to any particular details as regards the construction of the jaws. My main improvement consists in the mode of operating them.

E is a cord which is passed around pulleys F F in the ends of the levers, by means of which the jaws are closed by an upward pull, and the tongs raised or partly raised from the water, as may be desired.

G is a cord by means of which the jaws are opened beneath the water.

H is a slotted bar, which slides in grooves in the caps of the fulcrum-pin B'.

The cord G is attached to the upper end of this bar, as seen in the drawing.

I I are two bars, which are jointed to the levers at the points J J and jointed together at their lower ends by a pin, K, which also passes through the lower end of the bar H, forming a joint for the three.

As the upper ends of the bars I are spread apart when the jaws are closed, and as the bar H works vertically only, it will be seen that when the bar H is drawn up the jaws will be spread apart or opened, and that, when the cord E is drawn upward, the ends of the levers A B will be drawn toward each other, and the jaws will be closed, and may be raised. By this arrangement the jaws may be both opened and closed when the tongs are entirely beneath the water.

The advantages of this mode of constructing and operating oyster-tongs will be obvious to all who are acquainted with the subject.

I am aware that the mechanism for operating the jaws is not, in itself, new, but has been heretofore employed in hay-forks. Therefore, I do not desire to claim this separately as any part of my invention; nor do I wish to claim open-work jaws by themselves as new; but What I esteem to be my invention, and desire to protect by Letters Patent, is—

The combination of levers A B, pulleys F F, cords E G, slotted sliding bar H, and toggle I I, with the open-work jaws C D, constructed as described, to form a pair of oyster-tongs.

EDWARD WARD.

Witnesses:
GEO. W. TAYLOR,
THOS. CANNON.